March 27, 1962 J. BYRNE ET AL 3,027,244
RADIAL FLOW CATALYTIC REACTOR
Filed Feb. 9, 1959
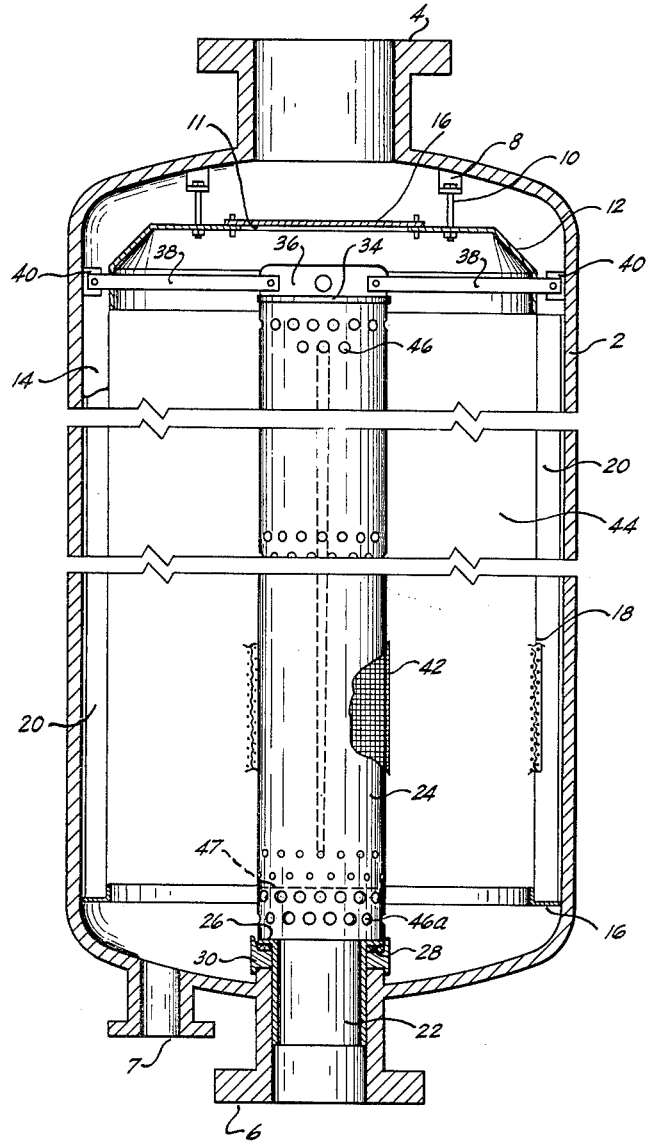
INVENTORS:
RICHARD V. McDOWELL
FRANK M. LAMMERMAN
JOSEPH BYRNE
BY James S. Henderson
AGENT

3,027,244
RADIAL FLOW CATALYTIC REACTOR
Joseph Byrne, Walnut Creek, Richard V. McDowell, Vallejo, and Frank N. Lammerman, Napa, Calif., assignors to Union Oil Company of California, Los Angeles, Calif., a corporation of California
Filed Feb. 9, 1959, Ser. No. 792,030
10 Claims. (Cl. 23—288)

This invention relates to an improved apparatus for carrying out fixed-bed catalytic conversion processes. More specifically, the apparatus is an improved radial flow reactor of the type wherein vaporized feedstock flows in one end of a cylindrical reactor and is diverted outwardly toward the shell thereof and into an outer cylindrical annulus, and then flows inwardly through a cylindrical annulus of granular catalyst, and finally flows into an axially positioned perforated center-pipe through which it emerges at the opposite end of the reactor. The gist of the invention consists in providing a modified center-pipe containing perforations which are suitably varied in size and/or spacing over the length of the center-pipe, so as to provide uniform horizontal flow of feedstock at all levels of the catalyst bed, and thereby obtain maximum efficiency in catalyst utilization.

Radial flow reactors of the type described above are used in preference to axial flow reactors where it is desired to minimize the over-all pressure drop through a catalytic reactor. However, these radial flow reactors present complicated problems in engineering design and fluid mechanics. One of the prime requisites from the standpoint of economics is to devote as large a space as possible within the reactor to actual catalyst contacting volume, in order to minimize materials and construction costs. This consideration has dictated that the space within the reactor which is devoted to mere fluid transport should be minimized. The principal fluid transport zones, not occupied by catalyst, consist of the outer, cylindrical feed-inlet annulus, and the space occupied by the center-pipe through which the vapors are removed. But minimizing the cross-sectional areas of the outer annulus and of the center-pipe leads to serious difficulties. Obviously, if the outer annulus and the center-pipe could be of sufficiently large cross-sectional area, then the pressure drop under flow conditions from the top to the bottom of these respective zones would be negligible and there would be uniform flow through all levels of the catalyst bed. However, since economic considerations dictate that the center-pipe area and the outer annulus area must be minimized, it is found in practical operation that very significant pressure drops do occur from top to bottom of these zones under normal flow conditions, and this pressure drop is especially noticeable in the center-pipe, since it is usually designed to be of smaller cross-sectional area than the outer annulus.

As a result of the foregoing, it has been found that when the perforations in the center-pipe are uniformly sized and distributed from top to bottom, there is a substantially greater flow rate through the catalyst in the lower portion of the reactor than through the top section. This condition leads to serious difficulties in maintenance and control of reaction conditions, places restrictions on over-all product quality, and leads to differential rates of catalyst deactivation at different levels of the reactor. As a result of the latter factor, it is often found necessary to shut down a reactor for regeneration at a time when only about 25% to 50% of the catalyst actually needs regeneration. It is therefore the objective of this invention to provide novel means for solving the problem of differential flow rates through different levels of the catalyst bed; to provide for substantially equal rates of catalyst activity decline throughout the reactor, and to simplify the problems of process control by providing substantially uniform conditions throughout. Other objectives will be apparent from the more detailed description which follows.

According to our invention, we obtain uniform flow throughout the catalyst bed by providing a gradation in total perforation area at different levels of the center-pipe. This gradation may be achieved either by perforating the center-pipe with a uniform pattern of holes decreasing in size from one end to the other, or by providing holes of uniform size but decreasing in number per unit length of pipe from one end to the other. In either case it would, of course, be ideal to provide that the total hole area at each horizontal level should vary evenly from the hole area at successive levels. However, as a practical matter, it is found best simply to divide the center-pipe up into several sections, e.g., 4 to 12 sections, and vary the total perforation area per unit of length from section to section.

In most cases it is found that the hole area per unit length of center-pipe should be largest at the feed inlet end of the reactor and smallest near the feed outlet end. This condition however obtains only where the ratio of center-pipe cross-sectional area to outer annulus cross-sectional area is such that there is a larger pressure drop in the center-pipe (and higher fluid velocity) under uniform flow conditions than there would be in the outer annulus. An opposite distribution of hole area would be utilized where there is a greater pressure drop from top to bottom of the outer annulus than from top to bottom of the center-pipe.

In most cases, radial flow reactors are operated with the feed inlet at the top, and with the center-pipe delivering product out the bottom. Where this type of flow is concerned, another problem has been found to arise. The entering feed always carries along a certain amount of debris, including rust and carbon particles from transfer conduits and other apparatus. Catalyst fines may also become entrained in the feed as it flows down the outer annulus. The over-all result is that this debris tends to collect in the bottom of the outer annulus, and is blown and gravitates into the outer layers of catalyst. This results in local flow restriction and a relatively higher pressure drop across the extreme lower section of the catalyst bed. To overcome this difficulty, we provide near the bottom of the center-pipe a section of relatively large perforation area, as for example, 1 to 5 rows of holes of considerably larger diameter than those immediately above.

The invention may perhaps be more readily understood with reference to the accompanying drawing, which is an elevational view partly in cross-section of a suitable radial flow reactor embodying center-pipe holes substantially evenly spaced over the entire length, but decreasing in diameter from top to bottom. It will be understood in the description of this apparatus that all parts are constructed of suitable corrosion-resistant metals capable of withstanding temperatures approaching 1200° F.

The reactor consists principally of an outer cylindrical shell 2 with a feed inlet nozzle 4 and a product outlet nozzle 6. An additional nozzle 7 is provided at the bottom of the reactor to permit withdrawal of spent catalyst. Supported from the top shoulders of shell 2 by means of hanger brackets 8 and hanger bolts 10, is a circular depending shroud 12 which acts to deflect the feed into the outer annulus 14. A center-hole 11 is provided in shroud 12 to permit entry into the lower part of the reactor. This center-hole is suitably covered by a circular manhole cover 16, bolted at its outer periphery to shroud 12.

Near the bottom of shell 2 a circular supporting bracket 16 is provided, and resting thereon is a cylindrical screen 18 which is supported laterally by a suitable number, e.g., 6 to 12, of longitudinal rib flanges 20, which may be spot-welded to shell 2. The cylindrical screen 18 acts as a catalyst-retaining member through which the feed may pass freely.

Fitted within lower nozzle 6 is a flanged supporting sleeve 22, on which center-pipe 24 rests. The flange 26 of sleeve 22 in turn rests upon a suitable annular gasket 28 of asbestos, or other suitable heat-resistant packing. A retaining ring 30 is provided to maintain the center-pipe in axial alignment. Retaining ring 30 in turn rests upon the upper end of nozzle 6.

Center-pipe 24 is closed at its upper end by a suitable circular plate 34 which may for example be seam welded to the top of the pipe. A lifting and reinforcing lug 36 is welded to plate 34. Three or more stabilizer bars 38 are provided to give lateral support to the top of the center-pipe. Stabilizer bars 38 may suitably be bolted at their inner ends to lifting lug 36, and at their outer ends to brackets 40 which are welded to outer shell 2.

A cylindrical screen 42 encasing the entire outer circumference of center-pipe 24 is also provided in order to prevent catalyst, which fills the entire annulus 44, from falling through the perforations 46. The cylindrical screen should hence be of a mesh size just sufficient to retain the catalyst, but afford no substantial impedance to fluid flow. Preferably, the screen is spot-welded at a plurality of points to center-pipe 24.

Particular attention is directed to the character of the perforations 46. As indicated, the perforations decrease substantially in size from the top of the pipe to a transition level indicated at 47, near the bottom of the center-pipe. The difference in hole size from top to bottom will of course depend primarily upon the ratio of fluid velocities at each given level as between center-pipe and outer annular space. Where large velocity differentials are involved, the gradient in hole size will be relatively larger than where small velocity differentials are involved. In any given reactor, feed rates will also affect the hole size gradient, but to a lesser extent. A convenient pattern for the perforations is simply to arrange them in circumferential rows, each row being staggered with respect to adjacent rows. This provides maximum uniformity of hole distribution over the entire circumference. Although the illustration shows circular perforations, holes of other shapes may also be employed. It will be noted that the bottom two rows of holes 46a, below transition level 47, are substantially larger than the immediately preceding holes. This is to compensate for impeded flow through the bottom layers of catalyst as a result of debris blockage as described above.

It is not intended that the invention should be limited to the details shown in the drawing. Many other modifications of the apparatus elements are contemplated and it is intended to include all such modifications. In particular, one contemplated modification involves using, instead of a cylindrical outer catalyst retaining member 18, a series of longitudinal screen scallops, as described in U.S. Patent No. 2,634,194. This arrangement provides, in place of cylindrical annulus 14, a series of longitudinal channels of lenticular cross-section extending the length of the reactor. Hence, where a "generally cylindrical" outer catalyst retaining member is referred to herein, it is intended that this shall include all modifications which provide for the passage of feedstock substantially uniformly down the inner periphery of the reactor walls, and thence horizontally through the catalyst bed.

The ideal diameter of the holes in the center-pipe at any given horizontal level can be computed as follows: First, determine the total number of holes to be drilled in the entire center-pipe, then from the assumed total fluid flow rate through the reactor, calculate the volume, F, of fluid flow per second through each hole, assuming that an equal flow-rate through each hole is desired in order to equalize flow through the catalyst at all levels. For this purpose, differences in density of fluid throughout the reactor can be ignored, since the total pressure drop is generally not more than about 10 p.s.i. Then, the hole area A (and hence diameter, $d$) can be calculated from the equation:

$$A = \frac{F \times 144}{V}$$

where V is linear velocity of fluid flow through the particular hole in feet per second. V in turn is calculated from the equation:

$$V^2 = \frac{144 \times 2g \times \Delta P}{K\rho} = \frac{9270 \times \Delta P}{K\rho}$$

where K is the experimentally determined number of velocity heads for the particular flow rate required, $\rho$ is the fluid density in pounds/cubic foot, and $\Delta P$ is the pressure drop across the particular hole which is required in order that the total pressure drop for each direct path through the entire reactor will be the same, as determined by standard fluid mechanics calculations.

The foregoing assumes an equal number of holes per linear foot of center-pipe. However, the same calculations can be transposed so as to determine roughly a proper unequal distribution of equal sized holes. This may be done for example by computing the total hole area at each horizontal level of the center-pipe, and dividing by whatever individual hole area is to be used throughout.

The foregoing calculations were applied to a specific case for a center-pipe 15 inches in diameter and 30 feet in length, to contain 125 equally spaced horizontal rows of holes with 16 equally spaced holes per row. Flow rate through the reactor was assumed to be 133 cubic feet per second. The results were as follows:

*Table 1*

| Ft. Below Top Row of Holes | $\Delta P$, p.s.i. | K | V, Ft./Sec. | Hole Diameter, inches |
|---|---|---|---|---|
| 0 | 0.324 | 2.0 | 49.0 | 0.50 |
| 3 | 0.375 | 1.9 | 54.0 | 0.476 |
| 6 | 0.474 | 1.82 | 62.2 | 0.443 |
| 9 | 0.619 | 1.75 | 72.5 | 0.413 |
| 12 | 0.809 | 1.7 | 84.0 | 0.381 |
| 15 | 1.043 | 1.6 | 98.4 | 0.354 |
| 18 | 1.319 | 1.5 | 114 | 0.328 |
| 21 | 1.632 | 1.45 | 129 | 0.308 |
| 24 | 1.983 | 1.4 | 145 | 0.291 |
| 27 | 2.370 | 1.35 | 161 | 0.276 |
| 30 | 2.792 | 1.3 | 178 | 0.262 |

Using the above data as a guide, a 30 ft. center-pipe was constructed with 125 equally spaced horizontal rows of holes, laid out as follows:

*Table 2*

| Feet Below Top of Pipe | No. of Rows of Holes | Hole Diameter, inches/32 |
|---|---|---|
| 0–3.35 | 15 | 16 |
| 3.35–6.7 | 14 | 15 |
| 6.7–9.57 | 12 | 14 |
| 9.57–12.44 | 12 | 13 |
| 12.44–15.79 | 14 | 12 |
| 15.79–20.1 | 18 | 11 |
| 20.1–25.6 | 23 | 10 |
| 25.6–29.19 | 15 | 9 |
| 29.19–29.67 | 2 | 16 |

This center-pipe was installed in a radial flow reactor 5 feet in diameter, and the catalyst zone was filled with a platinum-alumina reforming catalyst. The cross-sectional area of the outer feed-distributing annulus was 1.53 square feet. The reactor was then utilized for reforming a naphtha feedstock at 925° F., and a total throughput of about 300,000 pounds per hour. The unit was found to function in a highly satisfactory manner, with substantially uniform fluid flow throughout.

It is not intended that the invention should be limited to the details of construction described above; the true scope of the invention is intended to be embraced within the following claims.

We claim:

1. An improved radial-flow catalytic contacting reactor comprising in combination, a pressure-retaining outer chamber of generally cylindrical shape having an axially positioned fluid-inlet opening and an axially positioned fluid-outlet opening at opposite ends thereof, a fluid-permeable, generally cylindrical outer catalyst-retaining member supported coaxially within said outer chamber and spaced generally inwardly from the side-walls thereof so as to provide a peripheral feed distributing path of uniform cross-sectional area between said outer catalyst-retaining member and said side-walls and extending substantially the entire length of said outer catalyst-retaining member and communicating with said fluid inlet opening at the end adjacent thereto, a deflector plate closing the end of said outer catalyst-retaining member nearest said feed inlet opening and adapted to deflect fluid from said fluid inlet into said peripheral feed-distributing path, a unitary center-pipe of uniform cross-sectional area supported coaxially within said outer chamber and extending lengthwise substantially coextensively with said outer catalyst-retaining member but spaced substantially inwardly therefrom, said center-pipe terminating at one end near said deflector plate and being sealed at that end, the opposite end of said center-pipe being open and communicating coaxially in fluid delivery relationship with said fluid-outlet opening, said center-pipe being further characterized by circumferential perforations extending over substantially the entire length thereof which is coextensive with said outer catalyst-retaining member, the total area of said perforations per unit length of center-pipe decreasing incrementally from one end of said center-pipe to the other, and a cylindrical inner catalyst-retaining screen fitting closely around said center-pipe and covering the entire zone of perforations, said outer catalyst-retaining member, said deflector plate and said inner catalyst-retaining screen defining an open, elongated annular space adapted to confine a continuous bed of granular catalyst.

2. A reactor as defined in claim 1 wherein the cross-sectional area of said peripheral feed distributing path is substantially greater than the cross-sectional area of said center-pipe, and wherein the total area of said perforations per unit length of center-pipe decreases incrementally from said sealed end of center-pipe to said open end thereof.

3. A reactor as defined in claim 1 wherein the cross-sectional area of said center-pipe is substantially greater than the cross-sectional area of said peripheral feed distributing path, and wherein the total area of said perforations per unit length of center-pipe decreases incrementally from said open end of center-pipe to said sealed end thereof.

4. A reactor as defined in claim 1 wherein said perforations are distributed in a substantially uniform pattern over said center-pipe, and wherein the individual area of said perforations decreases incrementally from one end of said center-pipe to the other end.

5. A reactor as defined in claim 1 wherein said individual perforations are of substantially equal area, and are distributed in a pattern of decreasing numbers thereof per unit length from one end of said center-pipe to the other.

6. An improved radial-flow catalytic contacting reactor comprising in combination, a pressure-retaining outer chamber of generally cylindrical shape having an axially positioned fluid-inlet opening and an axially positioned fluid-outlet opening at opposite ends thereof, a fluid-permeable, generally cylindrical outer catalyst-retaining member supported coaxially within said outer chamber and spaced generally inwardly from the side-walls thereof so as to provide a peripheral feed distributing path of uniform cross-sectional area between said outer catalyst-retaining member and said side-walls and extending substantially the entire length of said outer catalyst-retaining member and communicating with said fluid inlet opening at the end adjacent thereto, a deflector plate closing the end of said outer catalyst-retaining member nearest said feed inlet opening and adapted to deflect fluid from said fluid inlet into said peripheral feed-distributing path, a unitary center-pipe of uniform cross-sectional area supported coaxially within said outer chamber and extending lengthwise substantially coextensively with said outer catalyst-retaining member but spaced substantially inwardly therefrom, said center-pipe being closed at its upper end, the lower end thereof being open and communicating coaxially in fluid-delivery relationship with said fluid-outlet opening, said center-pipe being further characterized by circumferential perforations extending over substantially the entire length thereof which is coextensive with said outer catalyst-retaining member, the total area of said perforations per unit length of center-pipe graduating in magnitude incrementally from the top of said center-pipe to a transition level located slightly above the bottom thereof, the total area of perforations per unit length of center-pipe below said transition level being substantially greater than the perforation area per unit length immediately above said transition level, and a cylindrical inner catalyst-retaining screen fitting closely around said center-pipe and covering the entire zone of perforations, said outer catalyst-retaining member, said deflector plate and said inner catalyst-retaining screen defining an open, elongated annular space adapted to confine a continuous bed of granular catalyst.

7. A reactor as defined in claim 6 wherein the cross-sectional area of said peripheral feed distributing path is substantially greater than the cross-sectional area of said center-pipe, and wherein the total area of said perforations per unit length of center-pipe decreases incrementally from said sealed end of center-pipe to said transition level.

8. A reactor as defined in claim 6 wherein the cross-sectional area of said center-pipe is substantially greater than the cross-sectional area of said peripheral feed distributing path, and wherein the total area of said perforations per unit length of center-pipe decreases incrementally from said transition level of center-pipe to said sealed end thereof.

9. A reactor as defined in claim 6 wherein said perforations are distributed in a substantially uniform pattern over said center-pipe, and wherein the individual area of said perforations is incrementally graduated in magnitude from the top of said center-pipe to said transition level.

10. A reactor as defined in claim 6 wherein said individual perforations are of substantially equal area down to said transition level, and are distributed in a pattern of decreasing numbers thereof per unit length from the top of said center-pipe to said transition level.

References Cited in the file of this patent

UNITED STATES PATENTS

| | | |
|---|---|---|
| 2,209,427 | Swanson | July 30, 1940 |
| 2,315,208 | Kinnaird | Mar. 30, 1943 |
| 2,469,367 | Burgess et al. | May 10, 1949 |
| 2,614,033 | Cornell | Oct. 14, 1952 |
| 2,635,989 | Bonner | Apr. 21, 1953 |
| 2,639,224 | McAfee | May 19, 1953 |
| 2,683,654 | Bergman | July 13, 1954 |